United States Defensive Publication [19] (H) [11] T966,012

Reicher [43] Jan. 3, 1978

[54] WOVEN ELASTIC FABRIC AND PROCESS FOR MAKING

[76] Inventor: Alexis Reicher, 12, Rue Albert Gros, 1206 Geneva, Switzerland

[21] Appl. No.: 768,614

[22] Filed: Feb. 14, 1977

[51] Int. Cl.[2] ..... D03D 15/00

[52] U.S. Cl. ..... 428/259; 156/148; 156/306; 428/296

[57] ABSTRACT

A slip-resistant woven elastic fabric is made of hard weft yarns and paired fusible elastomer leno warp yarns, the individual warp yarns of each pair crossing and recrossing each other at intervals throughout the fabric and being fused to each other at the crossover points.

4 Claims, 1 Sheet Drawing,

10 Pages Specification

The file of this unexamined application may be inspected and copies thereof may be purchased (849 O.G. 1221, Apr. 9, 1968).

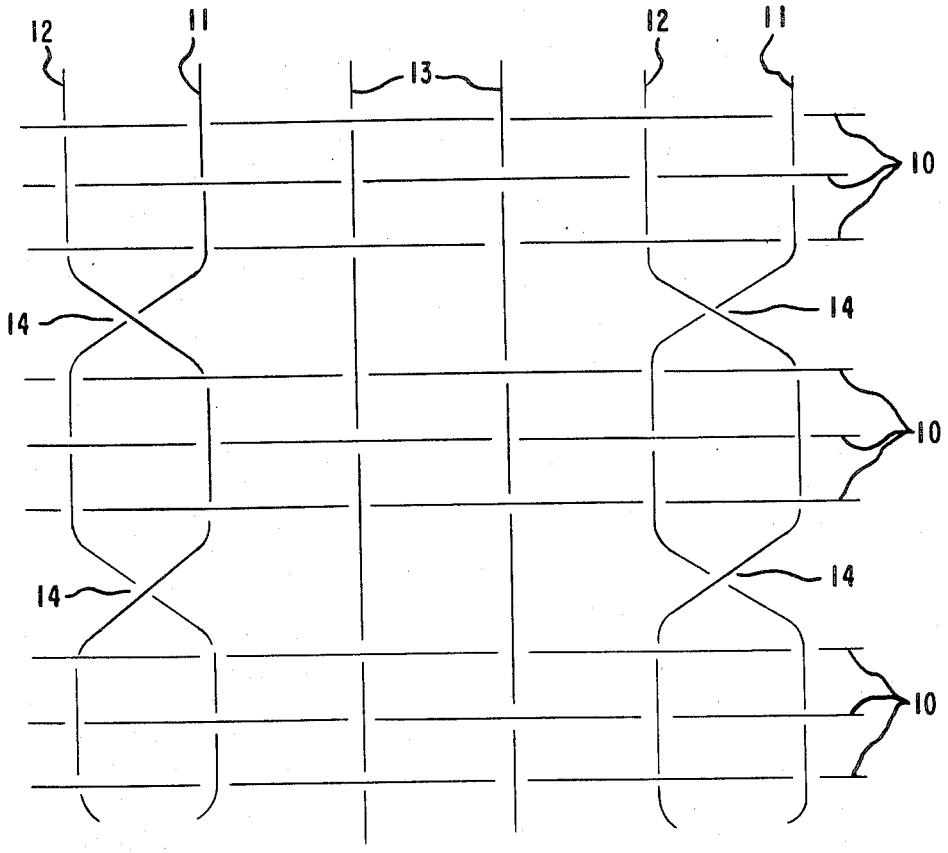

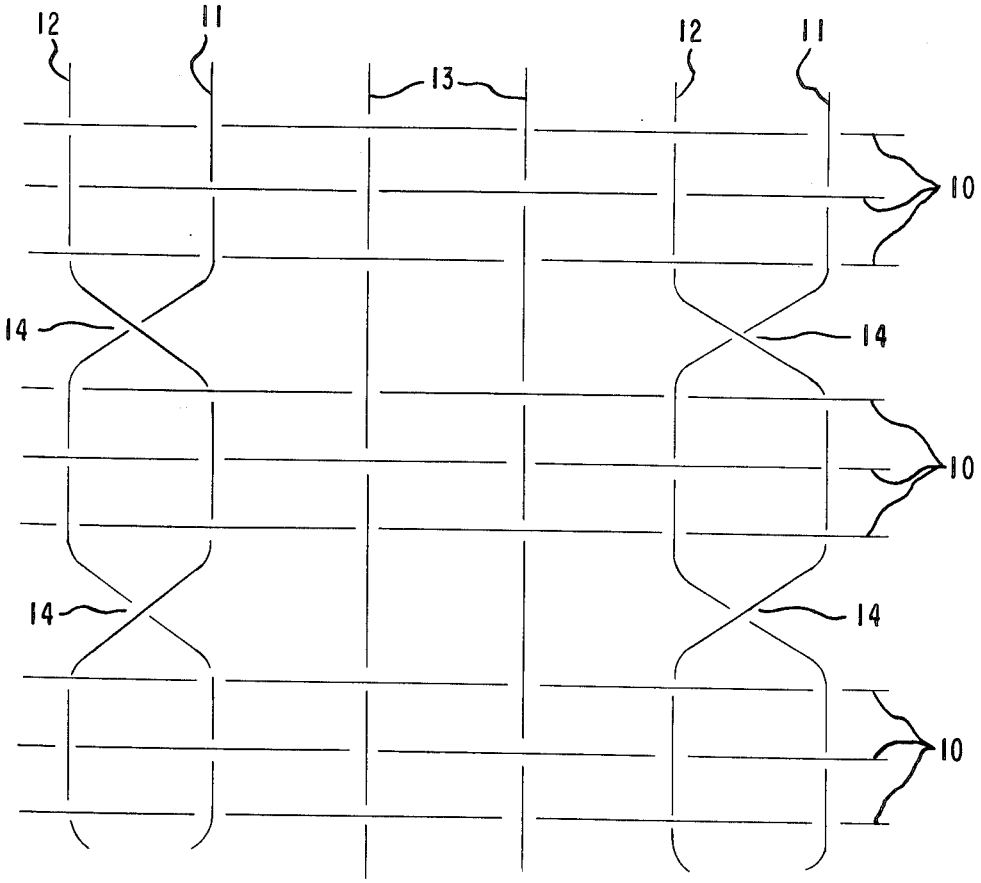
12
11
13
12
11
10
14
14
10
14
14
10